United States Patent
Solmaz

(10) Patent No.: US 12,283,083 B2
(45) Date of Patent: Apr. 22, 2025

(54) IMAGE GUIDED VIDEO THUMBNAIL GENERATION FOR E-COMMERCE APPLICATIONS

(71) Applicant: eBay Inc., San Jose, CA (US)

(72) Inventor: Berkan Solmaz, San Jose, CA (US)

(73) Assignee: eBay Inc., San Jose, CA (US)

( * ) Notice: Subject to any disclaimer, the term of this patent is extended or adjusted under 35 U.S.C. 154(b) by 338 days.

(21) Appl. No.: 17/545,497

(22) Filed: Dec. 8, 2021

(65) Prior Publication Data

US 2023/0177807 A1 Jun. 8, 2023

(51) Int. Cl.
*G06V 10/74* (2022.01)
*G06F 16/74* (2019.01)
(Continued)

(52) U.S. Cl.
CPC .......... *G06V 10/761* (2022.01); *G06F 16/743* (2019.01); *G06F 16/7847* (2019.01);
(Continued)

(58) Field of Classification Search
CPC ...... G06V 10/761; G06V 10/75; G06V 10/74; G06F 16/743; G06F 16/78;
(Continued)

(56) References Cited

U.S. PATENT DOCUMENTS 8,571,330 B2 * 10/2013 Gao ................... G06F 16/70
382/176
9,274,678 B2 3/2016 Lewis et al.
(Continued)

FOREIGN PATENT DOCUMENTS

CN 106503693 A * 3/2017 .......... G06F 16/739
CN 108733676 A * 11/2018
(Continued)

OTHER PUBLICATIONS

European Patent Office, "European search report," issued in connection with European Patent Application No. 22211213.8 dated Apr. 4, 2023 (7 pages).
(Continued)

*Primary Examiner* — Vu Le
*Assistant Examiner* — Jack Peter Kraynak
(74) *Attorney, Agent, or Firm* — FIG. 1 Patents

(57) ABSTRACT

Systems and methods are provided for automatically generating a thumbnail for a video on an online shopping site. The disclosed technology automatically generates a thumbnail for a video, where the thumbnail represents an item but not necessarily content of the video. A thumbnail generator receives a video that describes the item and an ordered list of item images associated with the item used in an item listing. The thumbnail generator extracts video frames from the video based on sampling rules and determines similarity scores for the sampled video frames. A similarity score indicates a degree of similarity between content of a video frame and an item image. The thumbnail generator determines weighted similarity scores based item images and occurrences of sampled video frames in the video. The disclosed technology generates a thumbnail for the video by selecting a sample video frame based on the weighted similarity scores.

18 Claims, 6 Drawing Sheets

(51) Int. Cl.
  *G06F 16/783* (2019.01)
  *G06Q 30/0601* (2023.01)
  *G06V 10/75* (2022.01)

(52) U.S. Cl.
  CPC ..... *G06Q 30/0633* (2013.01); *G06Q 30/0641* (2013.01); *G06V 10/75* (2022.01)

(58) Field of Classification Search
  CPC .......... G06F 16/74–748; G06F 16/7847–7864; G06Q 30/0633; G06Q 30/0641; G06Q 30/0601–0643; H04N 21/472
  See application file for complete search history.

(56) References Cited

U.S. PATENT DOCUMENTS

| | | | | |
|---|---|---|---|---|
| 9,747,622 | B1* | 8/2017 | Johnson | G06Q 30/0601 |
| 11,823,311 | B2* | 11/2023 | Li | H04N 21/2187 |
| 2011/0064318 | A1 | 3/2011 | Gao et al. | |
| 2014/0282743 | A1 | 9/2014 | Howard et al. | |
| 2016/0170985 | A1* | 6/2016 | Lewis | G06F 16/739 |
| | | | | 707/730 |
| 2016/0188997 | A1* | 6/2016 | Desnoyer | G06V 20/46 |
| | | | | 382/190 |
| 2018/0061459 | A1* | 3/2018 | Song | G06V 10/993 |
| 2019/0166397 | A1* | 5/2019 | Li | H04N 21/8153 |
| 2019/0333538 | A1* | 10/2019 | Yang | H04N 21/23418 |

FOREIGN PATENT DOCUMENTS

| | | | | |
|---|---|---|---|---|
| GB | 2562814 | B * | 6/2019 | G06K 9/00711 |
| JP | 6496388 | B2 * | 4/2019 | G06K 9/00711 |
| WO | WO-2014089447 | A1 * | 6/2014 | G06Q 30/0623 |

OTHER PUBLICATIONS 22211213.8, "Notice of Allowance", EP Application No. 22211213.8, Jan. 24, 2024, 35 pages.

24157734.5, "Extended European Search Report", European Application No. 24157734.5, Apr. 26, 2024, 11 pages.

24157734.5, "Invitation pursuant to Article 94(3) and Rule 71(1) EPC received for European Patent Application No. 24157734.5, mailed on Jul. 30, 2023", Jul. 30, 2024, 5 pages.

24157734.5, "Notice of Allowance / Intention to Grant 71(3)", EP Application No. 24157734.5, Nov. 5, 2024, 32 pages.

* cited by examiner

Weighted Similarity Score Matrix 302

| Sample # 304 | Similarity Scores 306 | | | | | #occurrences 318 | Weighted Similarity Score 320 |
|---|---|---|---|---|---|---|---|
| weight 322 | 1st Image 308 x10 | 2nd Image 310 x5 | 3rd Image 312 x3 | 4th Image 314 x2 | 5th Image 316 x1 | | |
| First | 0 | 0 | 0 | 0 | 30 | 3 | (0+0+0+0+30)*3 = 90 |
| Second | 70 | 100 | 60 | 10 | 0 | 10 | **(700+500+180+20+0)*10 =14000** |
| Third | 100 | 70 | 80 | 20 | 0 | 7 | (1000+350+240+40+0)*7 = 11410 |
| ... | | | | | | | |
| Hundred-sixth | 0 | 10 | 0 | 0 | 100 | 10 | (0+50+0+0+100)*10 = 1500 |

Frame Sampling Frequency 324: Sample every ten video frames
Minimum threshold 326: 10000

FIG. 3

IMAGE GUIDED VIDEO THUMBNAIL GENERATION FOR E-COMMERCE APPLICATIONS

BACKGROUND

In e-commerce platforms, use of videos for describing items in item listing helps buyers understand about the item meaningfully by watching the item in actual use in motion. While not playing the video, some e-commerce platforms display a textual title and/or a thumbnail (e.g., an image) that represents the video. Some e-commerce systems elicit sellers to create and upload a thumbnail that represents a video with the video. Some other e-commerce systems automatically generate a thumbnail using a thumbnail in a predetermined video frame of a video about the item. Yet some other systems automatically select and extract a video frame at a predetermined position (e.g., the first video frame, a video frame from a video segment that lasts for the longest time in the video) within the video as a thumbnail image. Some systems assess a visual quality of video frames in the video and select video frames with a level of quality that surpasses a threshold as thumbnail candidates. In practice, viewers often do not find that the automatically generated thumbnails sufficiently representing the item associated with the video. While the automatically generated thumbnails may represent the video, the extracted video frames from the video may not necessarily represent the item that prospective buyers would expect to see. Using thumbnails that accurately represent items in an e-commerce system improves efficiency and effective use of the online shopping marketplace because more sellers and buyers use the e-commerce system with confidence. Manually generating thumbnails is a time-consuming task for the sellers. Thus developing a technology that better meets the needs while minimizing trade-offs would be desirable.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

According to the present disclosure, the above and other issues are resolved by automatically generating a thumbnail image based on content of a video using a machine-learning model in an online shopping marketplace. The present disclosure relates to automatically generating a thumbnail image from a video in an e-commerce system. In particular, the disclosed technology determines weighted visual similarity between an image of an item for transaction and one or more video frames (i.e., frame images) of the video that describes the item.

The present disclosure relates to systems and methods for method for automatically generating a thumbnail according to at least the examples provided in the sections below. In particular, the present disclosure relates to a computer-implemented method for automatically generating a thumbnail image representing a video associated with a listing for an item in an electronic marketplace. The method comprises retrieving the video associated with the listing for the item, wherein the video comprises a plurality of ordered frame images; retrieving an item image associated with the listing for the item; determining at least a first score for a first frame image and a second score for a second frame image from the plurality of ordered frame images, wherein a score is based at least on a degree of similarity between the item image and a frame image. The method further comprises determining a first weight associated with the first frame image and a second weight associated with the second frame image, wherein the first weight is based at least on ordered positions of the first frame image; updating, the first score based upon the first weight and the second score based upon the second weight; selecting the thumbnail image from the first frame image or the second frame image, wherein the selecting is based upon the updated first score and the updated second score; and automatically adding the thumbnail image to the video.

The present disclosure further relates to a system for automatically generating a thumbnail image representing a video associated with an item. The system comprises a processor; and a memory storing computer-executable instructions that when executed by the processor cause the system to retrieve the video associated with the listing for the item, wherein the video comprises a plurality of ordered frame images; retrieve an item image associated with the listing for the item; determine at least a first score for a first frame image and a second score for a second frame image from the plurality of ordered frame images, wherein a score is based at least on a degree of similarity between the item image and a frame image; determine a first weight associated with the first frame image and a second weight associated with the second frame image, wherein the first weight is based at least on ordered positions of the first frame image; update, the first score based upon the first weight and the second score based upon the second weight; select the thumbnail image from the first frame image or the second frame image, wherein the selecting is based upon the updated first score and the updated second score; and automatically add the thumbnail image to the video.

The present disclosure further relates to a computer-implemented method for automatically generating a thumbnail image representing a video associated with a listing for an item in an electronic marketplace. The method comprises retrieving the video associated with the item, wherein the video comprises a plurality of frame images; retrieving a set of item images, wherein the set of item images include an item image associated with the item, and wherein a position of the item image corresponds to a position of the item image relative to other item images published on the listing for the item in the electronic marketplace; extracting a video frame from the video based on a sampling rule; determining, a score for the video frame, wherein the score represents a degree of similarity between the video frame and each item image of the set of item images; determining, based on the score, a weighted score for the video frame, wherein the weighted score includes a weight associated with a position of an item image of the set of item images; selecting, based on the weighted score, content of the video frame as the thumbnail image for the video; and publishing the thumbnail image for representing the video.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example of a data structure of similarity score data of a video in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Online shopping systems (e.g., e-commerce systems and online auctioning systems) rely upon sellers to prepare content that describe items for publishing on an online shopping site. The content typically includes textual descriptions of the item, one or more images that depict the item, a video that describes the item, and a thumbnail that describes the video at glance. Some traditional e-commerce systems automatically generate a thumbnail for a video by selecting a video frame at a predetermined position in the video.

For example, a seller may upload a video that describes a pair of shoes for sale. For example, the video may start with a title screen for a few seconds, followed by an overview image of the shoes, a series of close-up images of parts of the shoes (e.g., sole), textual descriptions about features of the bag, images of the shoes in a scenery, and a list of features of the shoes before ending the video. The seller may also upload a set of images associated with the pair of shoes.

Some traditional systems select a video frame at a predetermined position in the video as the thumbnail. An example of the predetermined position may include the first video frame or segment, a particular video frame at a predetermined time (e.g., three seconds, where typically including a title screen of the video) into the video, or the last video frame.

As discussed in more detail below, the present disclosure relates to automatically generating a thumbnail for a video that describes an item. In particular, the disclosed technology uses weighted similarity scores between images used in in an item listing and sample video frames from the video. A similarity score generator may use a machine-learning model (i.e., a similarity model) for determining a degree of similarity between an image of the set of images and each of sampled video frames. A weighted score generator generates a weighted sum of similarity scores of a sampled video frame as compared against respective images of the set of images. Furthermore, the disclosed technology weighs on a number of times that the sample video frame appears in the video.

Figure 1:
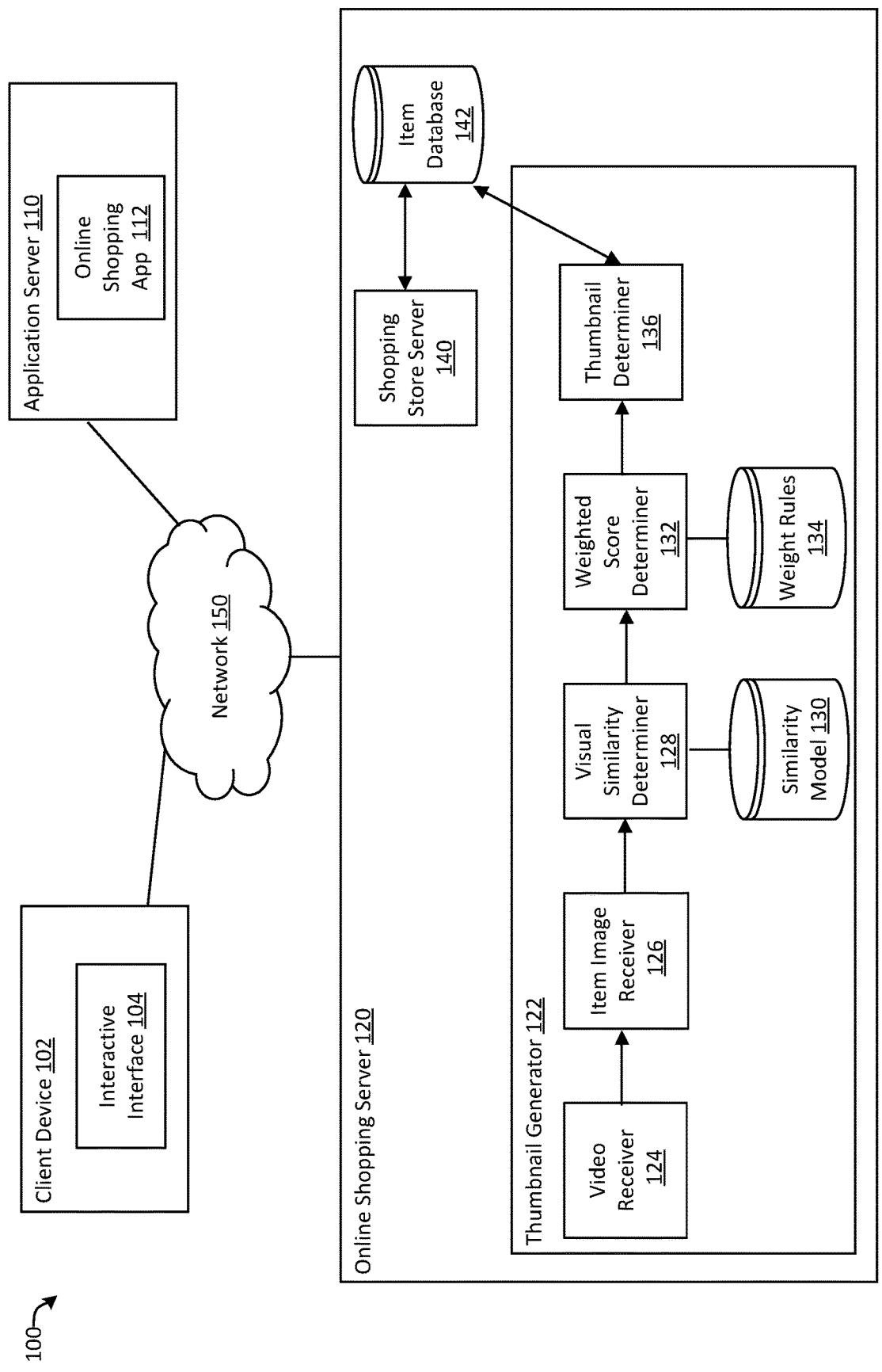
FIG. 1 illustrates an overview of an example system for automatically generating a thumbnail image of an item in accordance to aspects of the present disclosure.

FIG. 1 illustrates an overview of an example system 100 for automatically generating a thumbnail for a video in accordance with aspects of the present disclosure. System 100 represents a system for using a similarity model to determine similarity scores for respective sampled video frames of the video. In aspects, a similarity score indicates a level of similarity between content of a sampled video frame and an image of a set of images posted in an item listing on the online shopping site.

System 100 includes a client device 102, an application server 110, an online shopping server 120, a network 150, and an image data server 160. The client device 102 communicates with the application server 110, which includes one or more sets of instructions to execute as applications on the client device 102. The application server 110 includes an online shopping app 112 (i.e., an application). The one or more sets of instructions in the application server 110 may provide an interactive user interface (not shown) through an interactive interface 104.

The online shopping server 120 includes a video receiver 124, an item image receiver, a visual similarity determiner 128, a similarity model 130, a weighted score determiner 132, weight rules 134, a thumbnail determiner 136, a shopping store server 140, and an item database 142. The client device 102 connects with the application server 110 via the network 150 to execute applications that include user interactions through the interactive interface 104. The application server 110 interacts with the client device 102 and the online shopping server 120 via the network 150 to perform online shopping as a seller or a buyer of items.

The client device 102 is a general computer device providing user-input capabilities e.g., via the interactive interface 104 for online shopping over the network 150. In some aspects, the client device 102 optionally receives user input from a seller of items. The seller uploads information about an item for sales transactions in an online shopping marketplace (e.g., an electronic marketplace). The information about the item includes image data of the item, a brief description of the item, price information, quantity information, and the like. The interactive interface 104 may render a graphical user interface associated with a web browser, for example. In aspects, the client device 102 may communicate over the network 150 with the application server 110.

The application server 110 is a server that enables a seller (who may post items for sale) and a buyer (who purchases the items) for interactively using the system 100 on the client device 102. The application server 110 may comprise applications including the online shopping app 112. The online shopping app 112 may provide a rendering of items for a purchase by the user.

In aspects, the online shopping app 112 may connect with the video receiver 124 of the thumbnail generator 122 in the online shopping server 120 to post information about an item for sale on an online shopping site (not shown). In some aspects, the video receiver 124 may prompt a user to upload item images in a sequence where item images that are more representative of the item is to be uploaded before other item images. The information about the item may include a name, a brief description of the item, a quantity, a price, and one or more images that depict the item, and a video that describes the item. Additionally or alternatively, the information about the item includes category information of the item. For example, the item may include a pair of shoes. The one or more images may include photos of the shoes in different views, a table that lists product features, a close-up of product information with a product code, and a serial number of the item. The online shopping app 112 may receive a confirmation from the online shopping server 120 when the online shopping server 120 successfully receives the information about the item.

The online shopping server 120 represents the applications/systems used for generating a thumbnail for a video and publishing the thumbnail on the online shopping site. In particular, the thumbnail generator 122 uses a similarity model to match content of a sampled video frame against an image associated with the item. The thumbnail generator determines a thumbnail for the video from a set of video frames of the video based on a weighted similarity score.

The video receiver 124 receives a video about an item from the online shopping app 112 used by a seller through the interactive interface 104 on the client device 102. Additionally or alternatively, the video receiver 124 receives the video from an item database 142 when the seller has already uploaded the video and stored the video on the online shopping server 120.

The item image receiver 126 receives a set of images associated with the item from the online shopping app 112 used by the seller through the interactive interface 104 on the client device 102. Additionally or alternatively, the item image receiver 126 receives the set of item images from an item database 142 when the seller has already uploaded the set of images and stored the set on the online shopping server 120.

The visual similarity determiner 128 extracts a set of video frames from the video by sampling. For example, the visual similarity determiner 128 extracts a video frame in every predetermined time interval. In some other examples, the visual similarity determiner 128 extracts a video frame that follows content of the video changes more than a predetermined threshold. The visual similarity determiner 128 generates a pair between each of the sampled video frame and each image of the set of images. For example, when there are ten sampled video frames and five images in the set of images, the visual similarity determiner 128 generates fifty pairs of a video frame and an image.

The visual similarity determiner 128 may use a similarity model 130 to determine a similarity score for each pair. In aspects, the similarity model 130 may be a machine-learning model for predicting a similarity score. The similarity indicates a likelihood of content of a video frame being similar to an image. For example, a similarity score may be expressed in a range from zero to one hundred, where zero indicates being distinct and the one hundred indicates being identical.

The weighted score determiner 132 determines a weighted similarity score (i.e., a weighted score) to a pair of a sampled video frame and an image based on a similarity score of the pair. In aspects, each image may correspond to distinct weight. In aspects, the weighted score determiner 132 determines weighted similarity scores based on the weight rules 134. For example, images that appear before other images about an item may correspond to more weights. Images of an item that appear earlier in a list of images of items in an item description page on the online shopping site are more likely to be a representative of the item because these images stand out to the eyes of viewers more than other images that appear later in the list. In another example, content of video frames that appear more often than content of other video frames are likely to be more representative of the item because of a presumption that an image that represents an item would appear more often than other images in the video. In yet another example, a video frame toward the beginning of the video may have a higher weight than a video frame toward the end of the video. In aspects, the weighted score determiner 132 determines a weighted similarity score based on a weighted sum of similarity scores associated with a sampled video frame. The weighted score determiner 132 may further incorporate weights associated with a number of times (i.e., occurrence) of content of the sampled video frame appearing in other video frames in the video. For example, content of a video frame appearing more often than other content of video frames in the video may carry more weight. Additionally or alternatively, a weight may be based on a degree of a frame image indicating particular characteristics of an item. The characteristics may include shape, color, and/or visual content of the frame image.

The thumbnail determiner 136 determines a thumbnail for the video. In aspects, the thumbnail determiner 136 selects a sampled video frame with the highest weighted similarity score among the sampled video frames as the thumbnail for the video. The thumbnail determiner 136 stores the thumbnail for the video in the item database 142. The shopping store server 140 may publish the thumbnail for the video on the online shopping site.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
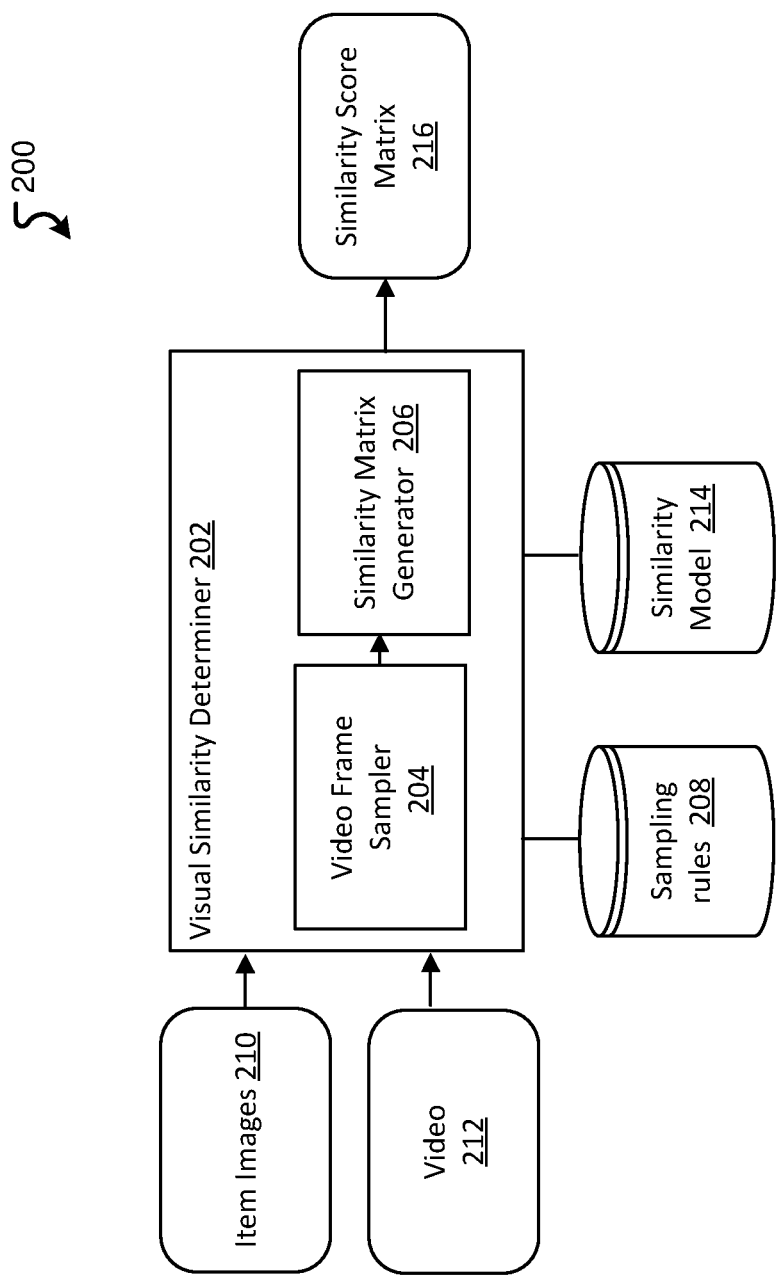
FIG. 2 illustrates an example of an example of determining similarity scores in accordance with aspects of the present disclosure.

FIG. 2 illustrates an example of a visual similarity determiner 202 according to the aspects of the present disclosure. In FIG. 2, the system 200 illustrates a visual similarity determiner 202 using a similarity model 214. The visual similarity determiner 202 includes a video frame sampler 204 and a similarity matrix generator 206. In aspects, the visual similarity determiner 202 receives a set of item images 210 and a video 212 as input and generates a similarity score matrix 216.

The video frame sampler 204 extracts sample video frames from video frames of the video 212 using a predetermined sampling rule 208. For example, the predetermined sampling rule 208 may include sampling video frames in a predetermined number of video frames (e.g., every ten video frames) and/or a time interval. Based on sampling, the video frame sampler 204 generates a set of sampled video frames.

The similarity matrix generator 206 generates a similarity score matrix 216 by generating similarity scores for the pairs of a video frame and an image. The similarity score matrix includes a similarity score between each sampled video frame of the sampled video frames and each item image of the set of item images 210. In aspects, the similarity matrix generator 206 uses a similarity model 214 for determining a similarity score for each pair of a video frame and an item image. The similarity model 214 may be a machine-learning model that is trained for predicting a similarity between two pieces of image data containing information associated with items for transactions on the onsite shopping site. For example, a similarity score may be expressed as a value between zero and one hundred, zero indicating the two pieces of image data being distinct and one hundred indicating the two pieces of image data being identical.

In aspects, the similarity score matrix 216 may include the sampled video frames as rows and item images as columns. Accordingly, the similarity score matrix 216 includes similarity scores associated with pairs of a video frame and an item image. In aspects, a weighted score determiner (e.g., the weighted score determiner 132 as shown in FIG. 1) generates a weighted similarity score matrix (e.g., an example of a weighted similarity score matrix 302 as shown in FIG. 3) by determining weighted sums of similarity scores.

FIG. 3 illustrates an exemplary data structure of a weighted similarity score matrix in accordance with the aspects of the present disclosure. FIG. 3 illustrates an example 300 depicting a weighted similarity score matrix 302. The weighted similarity score matrix 302 includes weight 322 associated with the respective item images and scored associated with the respective sampled video frames 304 in rows. The weighted similarity score matrix 302 further includes a 1st image 308 (i.e., a first item image), a 2nd image 310 (i.e., a second item image), a 3rd image 312 (i.e., a third item image), a 4th image 314 (i.e., a fourth item image), and a 5th image 316 (i.e., a fifth item image). The weighted similarity score matrix 302 further includes a number of occurrences 318 of a video frame in the video and a weighted similarity score 320 in the respective columns. The exemplary data is based on a frame sampling frequency 324 of every ten video frames. The weighted similarity score matrix 302 may specify a threshold for determining a sampled video frame as a thumbnail (e.g., 10,000 points). In aspects, the threshold may be a predetermined threshold.

Figure 4:
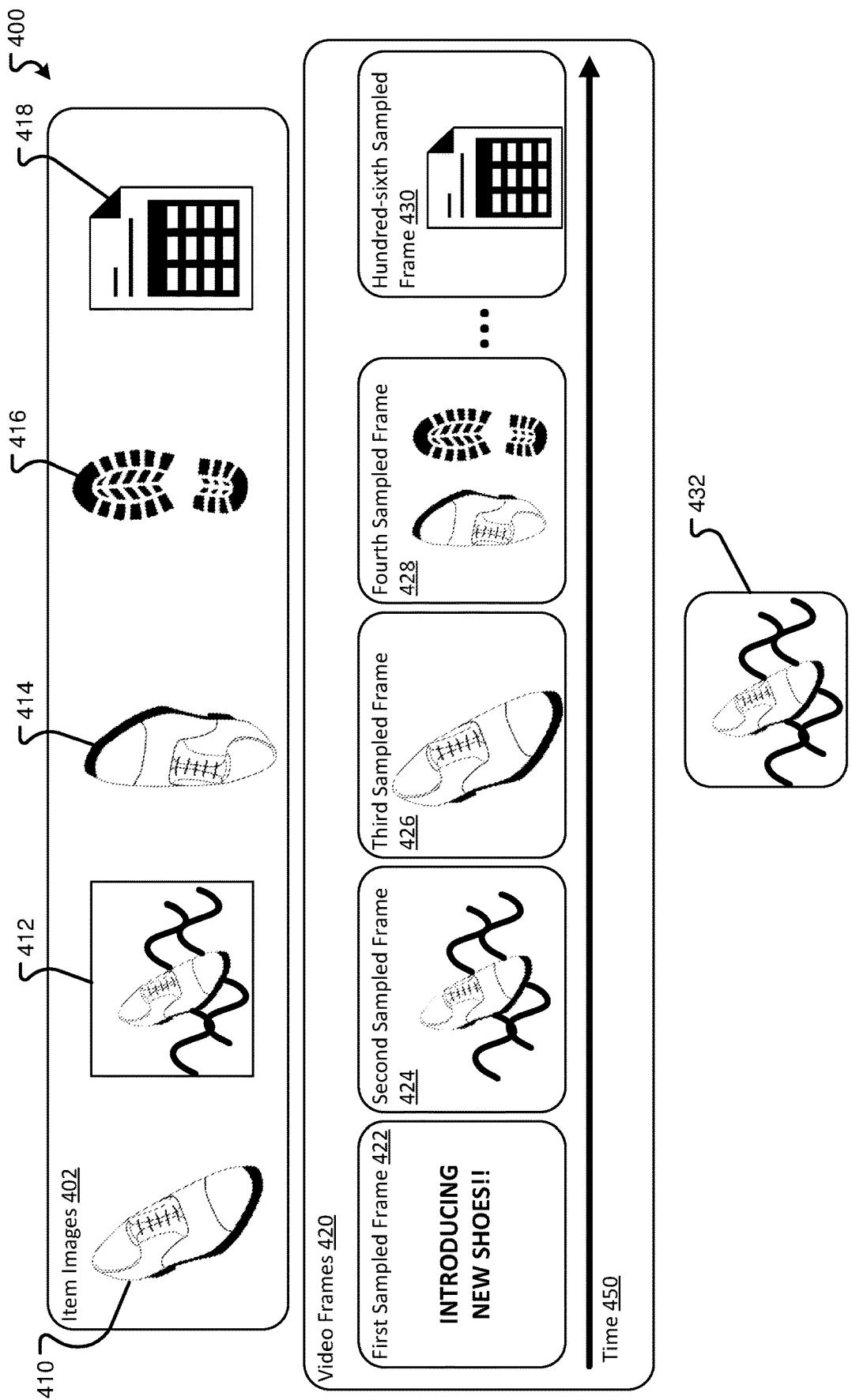
FIG. 4 illustrates an example of a data structure of weighted visual similarity score of a video in accordance with aspects of the present disclosure.

In aspects, the disclosed technology uses higher multipliers as weight values for item images that appear earlier in a list of item images. Item images appearing early in a list of item images in an item description page on the online shopping site tends to be more representative of the item than those item images that appear later in the list. For example, a first item image may depict an overview photo of an image with a clear background. A second item image may depict the image with a scenery background. An item image toward the end of the list may depict a textual description of features of the item (e.g., a list of item images 402 as shown in FIG. 4). Accordingly, a row labeled as weight 322 indicates ×10 (i.e., computing a weighted similarity score by multiplying a similarity score by ten) for the 1st image 308, ×5 (i.e., multiplication by five) for the 2nd image 310, ×3 for the 3rd image 312, ×2 for the 4th image 314, and ×1 (i.e., not weighted) for the 5th image 316. For example, when a similarity score between a video frame and a first item image is 70, a weighted similarity score is 70×10=700. A number of occurrences 318 corresponds to a number of times that content of a sampled video frame appears in the video. The weighted similarity score 320 indicates a weighted sum of the similarity scores associated with sampled video frame.

For example, a first sampled video frame indicates a value zero as similarity scores for the 1st image 308, the 2nd image 310, the 3rd image 312, and the 4th image 314. The first sampled video frame has a similarity score of 30 for the 5th image 316. The first sampled video frame appeared three times in the video. A second sampled video frame indicates following similarity scores for the respective five images: 70, 100 (i.e., the second sampled video frame is identical to the 2nd image 310), 60, 10, 0. The second sampled image appears ten times in the video. A third sampled video indicates following similarity scores for the respective five images: 100 (i.e., the third sampled video frame is identical to the 1st image 308), 70, 80, 20, 0. The third sampled image appears seven times in the video. A hundred-sixth sampled video frame indicates following similarity scores for the respective five images: 0, 10, 0, 0, 100 (i.e., the hundred-sixth sampled video frame sampled video frame is identical to the 5th image 316). The third sampled image appears ten times in the video.

In aspects, the weighted similarity score 320 of a sampled video frame is a weighted sum multiplied by a number of occurrences in the video. For example, a weighted similarity score 320 for the first sampled video frame is (0+0+0+0+10)×3=90. A weighted similarity score for the second sampled video frame is (700+500+180+20+0)×10=14000. A weighted similarity score for the third sampled video frame is (1000+350+240+40+0)×7=11410. A weighted similarity score for the hundred-sixth sampled video frame is (0+50+0+0+100)×10=1500. The weighted similarity score for the second sampled video frame is larger than other sampled video frames. Accordingly, the disclosed technology may select the second sampled video frame for a thumbnail for the video.

FIG. 4 illustrates an example of a list of item images and a sequence of video frames in accordance with the aspects of the present disclosure. FIG. 4 illustrates an example 400 including an ordered list of item images 402, video frames 420 in time sequence, and a thumbnail automatically generated using the disclosed technology.

As an example, the ordered list of item images 402 is in the order of significantly representing an item. The first item image 410 (an overview photo of a shoe) may be the most representative of a shoe as an item for transaction on the onsite shopping site. The ordered list of item images 402 further includes, in a descending order, a second item image 412 (an overview of the shoe with a background scenery), a third item image 414 (a vertical photo of the shoe), a fourth item image 416 (a sole of the shoe), a fifth item image 418 (a photo indicating feature descriptions of the shoe). In aspects, the ordered list of item images 402 correspond to the five item images (i.e., the 1st image 308, the 2nd image 310, the 3rd image 312, the 4th image 314, and the 5th image 316) as shown in FIG. 3.

The video frames 420 include an ordered list of sampled video frames from the video as sampled by a video frame sampler (e.g., the video frame sampler 204 of the visual similarity determiner 202 as shown in FIG. 2) from the video of an item (i.e., the shoe). In aspects, the ordered list is in a time sequence of video frames in the video as indicated by a directed line of time 450. A first sampled video frame 422 indicates a title scene of the video, showing a title of the video (i.e., "INTRODUCING NEW SHOES"). The first sampled video frame 422 has no corresponding item image in the item images 402. A second sampled video frame 424 indicates an overview of the shoe with a background scenery. The content of the second sampled video frame 424 is identical to the second item image 412. A third sampled video frame 426 indicates an overview of the shoe with a clear background. The content of the third sampled video frame 426 is identical to the first item image 410. A fourth sampled video frame 428 indicates a combination of a vertical photo of the shoe and a sole of the shoe. The content of the fourth sampled video frame 428 combines the third item image 414 and the fourth item image 416 in the sampled video frame. A hundred-sixth sampled video frame 430 indicates a photo indicating feature descriptions of the shoe. The content of the hundred-sixth sampled video frame 430 is identical to the fifth item image 418. In aspects, the first sampled video frame 422, the second sampled video frame 424, and the third sampled video frame 426 corresponds to the respective sampled video frames "First," "Second," and "Third" as shown in FIG. 3.

The thumbnail 432 indicates a thumbnail that is automatically generated by a thumbnail generator based on the weight similarity scores of the respective video frames as determined by a thumbnail determiner. In aspects, the thumbnail generate corresponds to the thumbnail generator 122. The thumbnail determiner corresponds to the thumbnail determiner 136 as shown in FIG. 1). The thumbnail determiner has determined the second sampled video frame 424 for the thumbnail 432 for the video because of the highest weighted similarity score (i.e., 14,000 as shown under the weighted similarity score 320 in FIG. 3).

Figure 5:
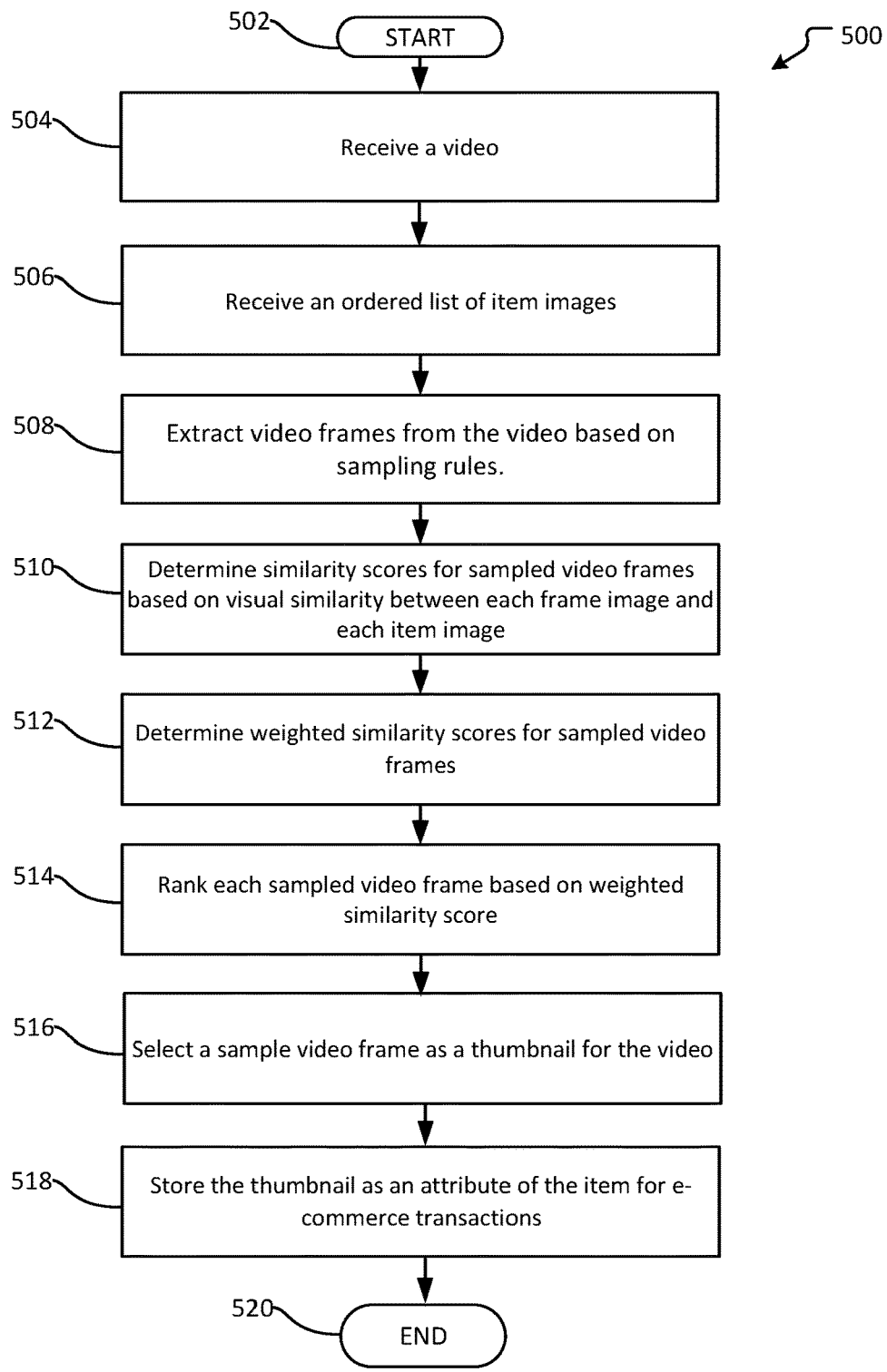
FIG. 5 illustrates an example of a method for automatically generating a thumbnail sin accordance with aspects of the present disclosure.

FIG. 5 is an example of a method for automatically generating a thumbnail for a video in accordance with aspects of the present disclosure. A general order of the operations for the method 500 is shown in FIG. 5. Generally, the method 500 begins with start operation 502 and ends with end operation 520. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, and 6.

Following start operation 502, the method 500 begins with receive operation 504, which receives a video that describes an item from a listing of the item (e.g., a description page of the item) on the online shopping site. In aspects, a seller uses an online shopping app as a seller and uploads information about the item to the online shopping server. The information about the item may include a name, a short description, a category of the item, one or more item images that represent the item, and the video that describes the item. For example, the video may include the video frames 420 as shown in FIG. 4 and other video frames that are not sampled in the present disclosure.

A receive operation 506 receives an ordered list of item images of an item. As detailed above, the seller uses the online shopping app as the seller and uploads the ordered list of item images. In aspects, the ordered list may be in the descending order of degrees where an item image represents an image of the item.

An extract operation 508 extracts a plurality of video frames from the video using sampling rules. For example, the extract operation 508 may extract a video frame per every ten video frames of the video according to the sampling rules (the predetermined sampling rule 208 as shown in FIG. 2).

A determine operation 510 determines similarity scores for the sampled video frames. The similarity score indicates a degree of similarity between two image data. A similarity scores for a sampled video frame indicates a degree of similarity between the sampled video frame and an item image in the ordered list of item images. For example, the degree of similarity may be expressed by setting a value of zero as being distinct and one hundred as being identical.

A determine operation 512 determines weighted similarity scores for the respective sampled video frames. For example, a weighted similarity score may use a plurality of weights as multipliers upon a similarity score. The plurality of weights may include but not limited to distinct weight values corresponding to item images (e.g., weight 322 as shown in FIG. 3) and a number of occurrence for the respective item images.

A rank operation 514 ranks each sampled video frame based on the weighted similarity scores. In aspects, a sampled video frame with a higher weighted similarity value may be ranked higher than other sampled video frames with lower weighted similarity values.

A select operation 516 selects a sampled video frame as a thumbnail for the video. In particular, the select operation 516 selects sampled video frame that is ranked the highest among other sampled video frames. In aspects, the select operation 516 may further generate the thumbnail based on content of the selected video frame according to specifications of a thumbnail for the video by resizing and/or cropping the content of the selected video frame. In aspects, the thumbnail may be identical to an item image of the set of item images. Additionally or alternatively, the thumbnail may indicate a degree of similarity to the item image, which is greater than a predetermined threshold.

A store operation 518 stores the thumbnail as an attribute of the item in an item database for e-commerce transactions at the online shopping site. The stored thumbnail may be published on the online shopping site as an image that represents the video. The thumbnail is based on one of the sampled video frames from the video. The end operation 520 follows the store operation.

Figure 6:
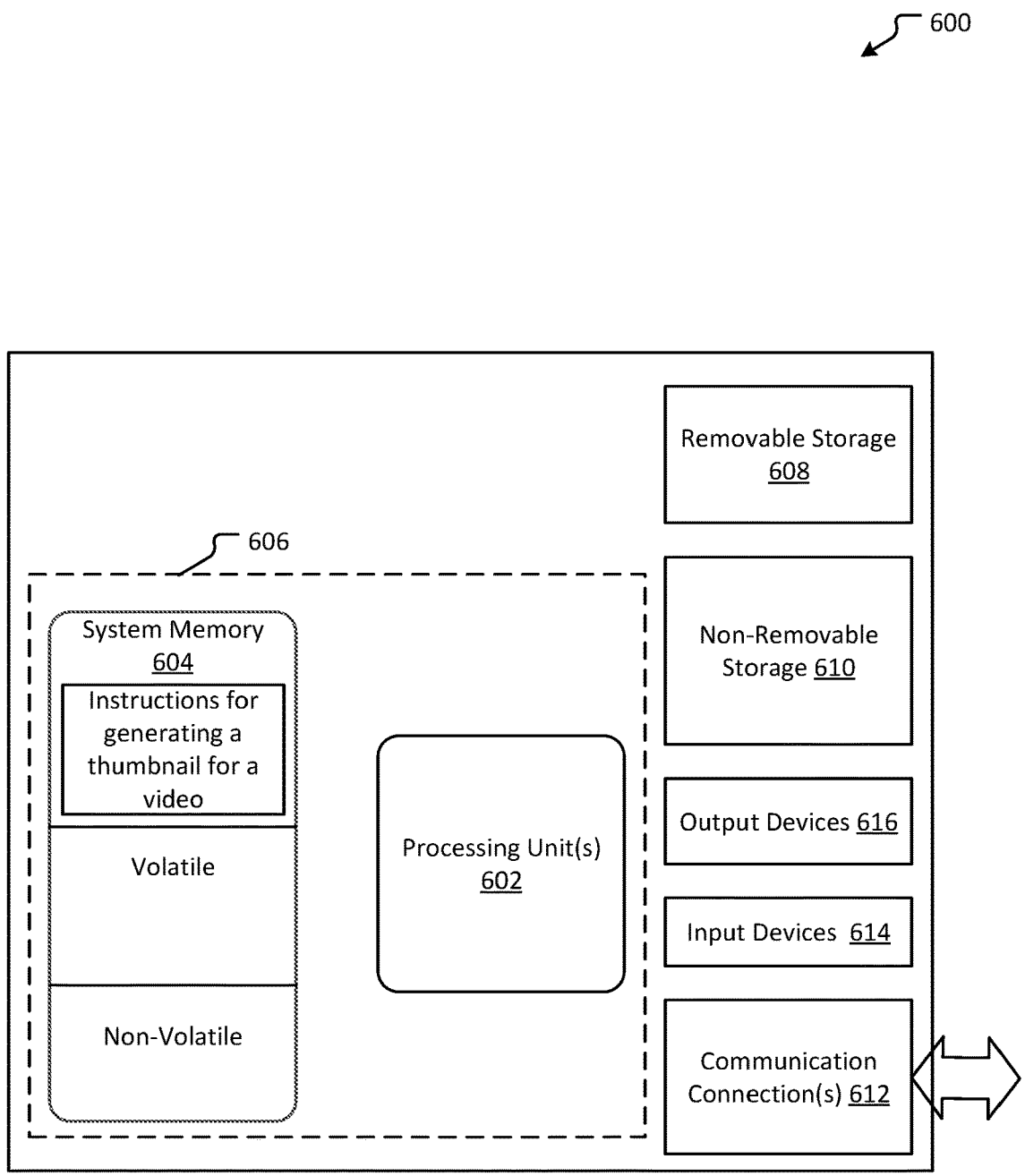
FIG. 6 is a block diagram illustrating example physical components of a computing device with which aspects of the disclosure may be practiced.

FIG. 6 illustrates a simplified block diagram of the device with which aspects of the present disclosure may be practiced in accordance with aspects of the present disclosure. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to automatically generate a thumbnail as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for method for automatically generating a thumbnail according to at least the examples provided in the sections below. The present disclosure relates to a computer-implemented method for automatically generating a thumbnail image representing a video associated with a listing for an item in an electronic marketplace. The method comprises retrieving the video associated with the listing for the item, wherein the video comprises a plurality of ordered frame images; retrieving an item image associated with the listing for the item; determining at least a first score for a first frame image and a second score for a second frame image from the plurality of ordered frame images, wherein a score is based at least on a degree of similarity between the item image and a frame image; determining a first weight associated with the first frame image and a second weight associated with the second frame image, wherein the first weight is based at least on ordered positions of the first frame image; updating, the first score based upon the first weight and the second score based upon the second weight; selecting the thumbnail image from the first frame image or the second frame image, wherein the selecting is based upon the updated first score and the updated second score; and automatically adding the thumbnail image to the video. The degree of similarity includes similarity between the item image and the first frame image. The first weight is based at least on ordered positions of the first frame image in the video. The first weight is based at least on a number of times that content of the first frame image appears in other frame images of the video. The first weight is based at least on a degree of the first frame image indicating characteristics of the item, wherein the characteristics of the item includes at least one of: shape, color, or visual content. The method further comprises extracting, based on a predetermined sampling rule, the first frame image and the second frame image from the video. The method comprises receiving another item image associated with the listing for the item, wherein the other item image is distinct from the item image; updating the first score based on a degree of similarity between the other item image and the first frame image; and updating the first score based on a third weight, wherein the third weight corresponds to the other item image. The method further comprises prompting a user for uploading one or more item images associated with the item in a descending order of relevance to the item.

Another aspect of the technology relates to a system for automatically generating a thumbnail image representing a video associated with an item. The system comprises a processor; and a memory storing computer-executable instructions that when executed by the processor cause the system to retrieve the video associated with the listing for the item, wherein the video comprises a plurality of ordered frame images; retrieve an item image associated with the listing for the item; determine at least a first score for a first frame image and a second score for a second frame image from the plurality of ordered frame images, wherein a score is based at least on a degree of similarity between the item image and a frame image; determine a first weight associated with the first frame image and a second weight associated with the second frame image, wherein the first weight is based at least on ordered positions of the first frame image; update, the first score based upon the first weight and the second score based upon the second weight; select the thumbnail image from the first frame image or the second frame image, wherein the selecting is based upon the updated first score and the updated second score; and automatically add the thumbnail image to the video. The first score indicates a degree of similarity between the item image and the first frame image. The first weight is based at least on ordered positions of the first frame image in the video. The first weight is based at least on a number of times where content of the first frame image appearing in other frame images of the video. The first weight is based at least on a degree of the first frame image indicating characteristics of the item, wherein the characteristics of the item includes at least one or: shape, color, or visual content. The computer-executable instructions when executed further cause the system to extract, based on a predetermined sampling rule, the first frame image and the second frame image from the video. The computer-executable instructions when executed further cause the system to receive another item image associated with the listing for the item, wherein the other item image is distinct from the item image; update the first score based on a degree of similarity between the other item image and the first frame image; and update the first score based on a third weight, wherein the third weight corresponds to the other item image. The computer-executable instructions when executed further cause the system to prompting a user for uploading one or more item images associated with the item in a descending order of relevance to the item.

In still further aspects, the technology relates to a computer-implemented method for automatically generating a thumbnail image representing a video associated with a listing for an item in an electronic marketplace. The method comprises retrieving the video associated with the item, wherein the video comprises a plurality of frame images; retrieving a set of item images, wherein the set of item images include an item image associated with the item, and wherein a position of the item image corresponds to a position of the item image relative to other item images published on the listing for the item in the electronic marketplace; extracting a video frame from the video based on a sampling rule; determining, a score for the video frame, wherein the score represents a degree of similarity between the video frame and each item image of the set of item images; determining, based on the score, a weighted score for the video frame, wherein the weighted score includes a weight associated with a position of an item image of the set of item images; selecting, based on the weighted score, content of the video frame as the thumbnail image for the video; and publishing the thumbnail image for representing the video. The sampling rule includes extracting a video frame at a predetermined interval of video frames in the video. The method comprises updating the weighted score for the video frame based on another weight associated with a position of the video frame in the plurality of video frames. A degree of similarity between the thumbnail image and at least one item image of the set of item images is greater than a predetermined threshold.

Any of the one or more above aspects in combination with any other of the one or more aspect. Any of the one or more aspects as described herein.

What is claimed is:

1. A computer-implemented method comprising:
   retrieving a video associated with a listing for an item, wherein the video comprises a plurality of ordered frame images and the video is uploaded by a seller on an online marketplace associated with the listing of the item;
   retrieving an item image uploaded by the seller and included in the listing for the item;
   determining at least a first score for a first frame image and a second score for a second frame image from the plurality of ordered frame images, wherein a score is based on a degree of similarity between the item image and a frame image;
   determining a first weight associated with the first frame image and a second weight associated with the second frame image, wherein the first weight is based on an ordered position of the first frame image that indicates a likelihood the first frame image is representative of the item;
   updating, the first score based upon the first weight and the second score based upon the second weight;
   selecting the first frame image or the second frame image as a thumbnail image, wherein the selecting is based upon the updated first score and the updated second score; and
   publishing the thumbnail image as a representation of the video.

2. The computer-implemented method of claim 1, wherein the degree of similarity includes similarity between the item image and the first frame image.

3. The computer-implemented method of claim 1, wherein the first weight is based on a number of times that content of the first frame image appears in other frame images of the video.

4. The computer-implemented method of claim 1, wherein the first weight is based on a degree the first frame image indicates characteristics of the item, wherein the characteristics of the item include at least one of shape, color, or visual content.

5. The computer-implemented method of claim 1, further comprising:
   extracting, based on a predetermined sampling rule, the first frame image and the second frame image from the video.

6. The computer-implemented method of claim 1, further comprising:
   receiving an additional item image included in the listing for the item, wherein the additional item image is distinct from the item image;
   updating the first score based on a degree of similarity between the additional item image and the first frame image; and
   updating the first score based on a third weight, wherein the third weight corresponds to the additional item image.

7. The computer-implemented method of claim 1, further comprising:
   prompting a user for uploading one or more item images associated with the item in a descending order of relevance to the item.

8. A system comprising:
   a processor; and a memory storing computer-executable instructions that when executed by the processor cause the system to:
retrieve a video associated with a listing for an item, wherein the video comprises a plurality of ordered frame images and the video is uploaded by a seller on an online marketplace associated with the listing of the item;
retrieve an item image uploaded by the seller and included in the listing for the item;
determine at least a first score for a first frame image and a second score for a second frame image from the plurality of ordered frame images, wherein a score is based on a degree of similarity between the item image and a frame image;
determine a first weight associated with the first frame image and a second weight associated with the second frame image, wherein the first weight is based on an ordered position of the first frame image that indicates a likelihood the first frame image is representative of the item;
update, the first score based upon the first weight and the second score based upon the second weight;
select the first frame image or the second frame image as a thumbnail image, wherein the selecting is based upon the updated first score and the updated second score; and
publish the thumbnail image as a representation of the video.

9. The system of claim 8, wherein the first weight is based on a number of times that content of the first frame image appears in other frame images of the video.

10. The system of claim 8, wherein the first weight is based on a degree the first frame image indicates characteristics of the item, wherein the characteristics of the item include at least one of shape, color, or visual content.

11. The system of claim 8, wherein the computer-executable instructions, when executed, further cause the system to:
extract, based on a predetermined sampling rule, the first frame image and the second frame image from the video.

12. The system of claim 8, wherein the computer-executable instructions, when executed further cause the system to:
receive an additional item image included in the listing for the item, wherein the additional item image is distinct from the item image;
update the first score based on a degree of similarity between the additional item image and the first frame image; and
update the first score based on a third weight, wherein the third weight corresponds to the additional item image.

13. The system of claim 8, wherein the computer-executable instructions, when executed, further cause the system to:
prompt a user for uploading one or more item images associated with the item in a descending order of relevance to the item.

14. A computer storage medium storing computer-executable instructions that, when executed by a processor, cause the processor to perform operations comprising:
retrieving a video associated with a listing for an item, wherein the video comprises a plurality of ordered frame images and the video is uploaded by a seller on an online marketplace associated with the listing of the item;
retrieving an item image uploaded by the seller and included in the listing for the item;
determining at least a first score for a first frame image and a second score for a second frame image from the plurality of ordered frame images, wherein a score is based on a degree of similarity between the item image and a frame image;
determining a first weight associated with the first frame image and a second weight associated with the second frame image, wherein the first weight is based on an ordered position of the first frame image that indicates a likelihood the first frame image is representative of the item;
updating the first score based upon the first weight and the second score based upon the second weight;
selecting the first frame image or the second frame image as a thumbnail image, wherein the selecting is based upon the updated first score and the updated second score; and
publishing the thumbnail image as a representation of the video.

15. The computer storage medium of claim 14, wherein the first weight is based on at least one of:
a number of times that content of the first frame image appears in other frame images of the video; or
a degree that the first frame image indicates characteristics of the item, wherein the characteristics of the item include at least one of shape, color, or visual content.

16. The computer storage medium of claim 14, wherein the operations further comprise:
receiving an additional item image included in the listing for the item, wherein the additional item image is distinct from the item image;
updating the first score based on a degree of similarity between the additional item image and the first frame image; and
updating the first score based on a third weight, wherein the third weight corresponds to the additional item image.

17. The computer-implemented method of claim 1, wherein at least one of:
a position toward a beginning of the video indicates a higher likelihood of representing the item;
the first weight is further based on a position of the item image in a list of images uploaded by the seller in connection with the listing for the item;
the first weight is further based on a number of times content of the first frame image appears in other frames of the video; or
the first weight is further based on a degree the first frame image indicates one or more characteristics of the item.

18. The computer-implemented method of claim 1, further comprising:
extracting a plurality of sampled frame images from the video based on a sampling rule, the plurality of sampled frame images including the first frame image and the second frame image, and
ranking the plurality of sampled frame images based on the degree of similarity between the item image and a sampled frame image.

* * * * *